Feb. 21, 1939. C. J. KILLETTE 2,148,162
APPARATUS FOR STRETCHING CORDS
Filed May 11, 1937
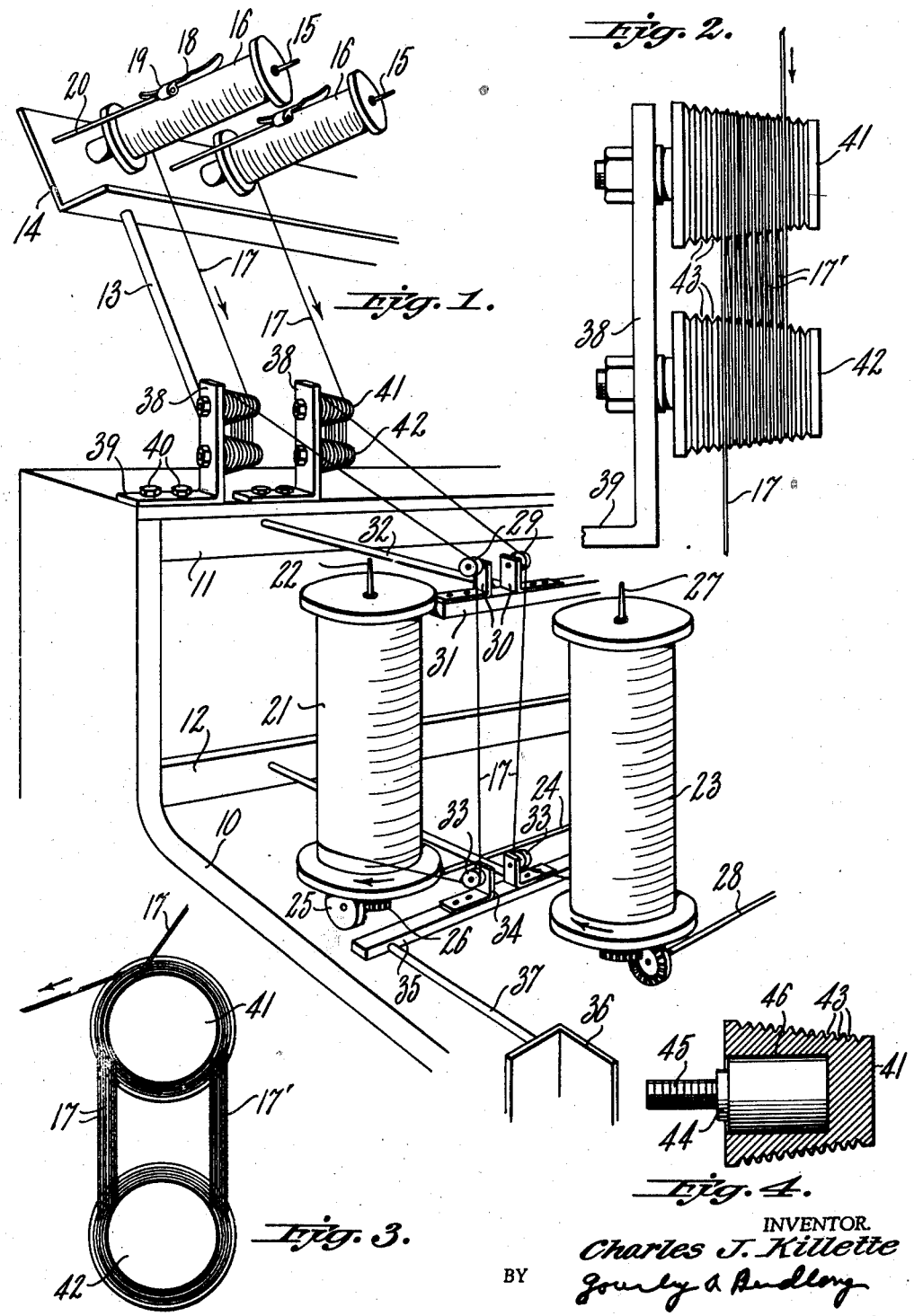

Patented Feb. 21, 1939

2,148,162

UNITED STATES PATENT OFFICE 2,148,162

APPARATUS FOR STRETCHING CORDS

Charles J. Killette, Hogansville, Ga., assignor, by mesne assignments, to United States Rubber Company, New York, N. Y., a corporation of New Jersey Application May 11, 1937, Serial No. 141,952

4 Claims. (Cl. 28—57)

This invention relates to what is herein called "a high tension cord", and more particularly to improved apparatus for imparting a permanent stretch, attenuation or elongation to a cord, such as a tire cord.

It is found that substantial improvements are secured in a tire by employing in the carcass thereof, cord which has been attenuated before it is embodied in the tire to thereby impart a permanent elongation to the cord, the effect of which is to actually increase the number of yards to the pound. This attenuating of the cord reduces to some extent the number of its twists per inch, and it is therefore desirable to employ a cord which has a sufficiently high cable twist before it is permanently stretched or attenuated to allow for the reduction of twist.

The permanent stretching or attenuating of the cord reduces its gauge and compresses the elements of the cord more closely together and holds the fibres of the yarn closer together. This, in the case of a cotton cord, lessens the tendency of the fibres to slip longitudinally of each other and reduces the percentage of stretch available in the finished and permanently elongated cord. The stretching of the cord imparts thereto greater tensile strength relative to the weight of the cord than ordinary cord. This facilitates the use of a smaller gauge cotton cord in the ply sheets of a tire carcass than heretofore, with various resulting advantages in the tire constructions.

The stretching or attenuating the cord as herein contemplated also serves to expel entrapped air from the interior of the cord. This reduction of the air within the cord appears to be beneficial in the performance of the tire.

The present invention resides in an extremely simple and practical method of and apparatus for imparting the desired amount of permanent stretch, attenuation or elongation to a cord. The invention may be employed to stretch cords formed of various fibres for use in the construction of belts and other articles of manufacture, but the invention pertains more particularly to the treatment of cotton tire cord.

It has been proposed heretofore to stretch cord and rope or cable by passing a number of convolutions thereof around two spaced conical rolls provided with a number of grooves of increasing diameter to receive the cord or cable. In these prior constructions, however, mechanism was employed for positively driving one or both of the conical rolls, to thereby effect a passage of the cord or cable about the stretching rolls. The driving of such roll or rolls, however, presented a serious problem in that their speed of rotation had to be correlated to the speed at which the cord or cable was removed from the stretching rolls, and this driving of the rolls increased the cost of operation to a serious amount in the production of cord. Furthermore, when one or both of the stretching rolls is driven, the cord or cable cannot be stretched or elongated as uniformly as when the method of the present invention is employed.

The invention resides primarily in a pair of free running grooved rolls about which the cord to be stretched is passed in a series of convolutions. The rolls may be grooved cone rolls or the grooves of the rolls may be otherwise arranged in stepped relation to successively stretch the cord. The cord is delivered to these stretching rolls from any suitable source of supply or let-off mechanism, and the take-up mechanism employed to draw the stretched cord from the stretching rolls is operated so that it will exert a sufficient pull upon the cord to cause it to operate both free running rolls and draw the cord from the source of supply. As a result of this simple construction no special driving means other than the cord being stretched is required to operate the stretching rolls and therefore either frictionally or positively driven take-up mechanism such as provided on various types of tire cord winding machines and other textile machines may be employed to effect the entire cord stretching operation. The free running rolls of the present invention are preferably provided with anti-friction bearings so that the cord drawn therefrom may operate these rolls with a minimum amount of friction and pull.

The above and other features of the invention, and novel combination of parts will be hereinafter described in connection with the accompanying drawing which illustrates one good practical form of the invention.

In the drawing:

Fig. 1 is a perspective view of a portion of a slubber frame of well known construction having the cord stretching mechanism of the present invention associated therewith.

Fig. 2 on a larger scale is a side elevation of the free running stretching rolls shown in Fig. 1.

Fig. 3 is a front end view of the free running rolls of Fig. 2; and

Fig. 4 is a vertical sectional view through one of the free running rolls of Fig. 2.

In Fig. 1 of the drawing, the tension roll assembly of the present invention is shown in connection with a slubber of usual construction but which has been modified to a considerable degree to carry out the present method. It is to be understood, however, that the tension roll assembly of the present invention may be employed in connection with various forms of cord let-off and take-up mechanism wherein the cord take-up mechanism is capable of exerting a sufficient pull upon the cord to rotate the free running rolls and draw the cord from the let-off mechanism or source of supply.

In the construction of Fig. 1, only the mechanism adjacent one end of the slubber frame is illustrated as having the end frame 10 to which is rigidly secured the longitudinally extending beam 11 and rail 12. Above the beam 11 is supported by means of the studs 13 the angle rail 14. This rail is provided at spaced intervals with the spindles 15 adapted to rotatably support the supply packages or spools 16, upon which the cord 17 to be stretched is wound. It is important that the force required to unwind the cord 17 from the spools 16 be substantially uniform irrespective of the amount of cord which remains upon the spool. Each spool 16 is therefore shown as having cooperating therewith, a presser pad or brake 18 adapted to rest upon the windings thereof and this presser pad has extending laterally therefrom an arm 19 the outer end of which is pivotally secured to a supporting post 20 attached to the angle rail 14. The arrangement is such, that the presser pad 18 swings through an arc of a circle and approaches the horizontal plane of the post 20 as the size of the yarn package decreases, with the result that the moment of weight of the presser pad is substantially constant, irrespective of the size of the package.

In the construction shown, the cord 17 supplied by the first spool 16, after being permanently attenuated or elongated in a manner to be described is wound upon a receiving package or spool 21. This receiving spool is mounted upon a fixed spindle 22, adapted to support the spool 21 for rotation at the desired surface speed. In the construction shown, the cord supplied by one spool 16, is received upon a spool 21, supported in one longitudinal row, and the cord supplied by the second spool 16, is wound upon a spool 23 supported in a second longitudinal row. It will be understood that only one spool in each of these rows is shown, whereas in the actual machine, each row may have a large number of these spools. The spool 21 upon the spindle 22 is driven from a longitudinally extending shaft 24, through the cooperating bevel gear 25 and pinion 26. The similar spool 23 is supported upon the fixed spindle 27 and is driven from the longitudinally extending shaft 28 by the cooperating bevel gear and pinion shown.

Each cord 17 upon leaving the tension roll assembly hereinafter described, passes around an upper pulley 29, rotatably supported by a bracket 30 which is secured to a longitudinally extending bar 31 that is supported by the studs 32 projecting from the beam 11, and then passes downwardly from the pulley 29 about a lower pulley 33 supported by a bracket 34 secured to a longitudinally extending bar 35 which is supported from the uprights 36 by the studs 37. The cord 17 passes from the lower pulley 33 to the receiving package or spool 21 or 23.

These spools with their supporting and driving mechanism are reciprocated or traversed in a vertical direction to wind the cord uniformly about the spools in adjacent coils. Furthermore the speed of the driving shafts 24 and 28 may be gradually decreased by mechanism, not shown, but well known in the art of winding to thereby cause the cord 17 to be supplied to these spools at a substantially uniform speed irrespective of the amounts of cord wound upon the spool or spools. If desired however frictionally driven take-up spools may be employed in place of the spools 21 and 23.

The construction and operation of the tension roll assembly of the present invention will now be described. Since the grooved rolls of this assembly are not driven, they may be located in any convenient or desired disposition between the let-off and take-up packages, and in the construction shown the tension roll assembly for each cord 17 is bolted to the upper face of the longitudinally extending beam 11 of the slubber frame.

The free running stretching rolls of the present invention are shown as supported in spaced relation one above the other by securing them to an angle bracket 38, the horizontally extending portion 39 of which is secured to the beam 11 by the bolts 40. The free running rolls 41 and 42 are or may be identical in construction and as shown, each roll has the form of a frustum of a cone provided with a number of annular grooves 43. These rolls however may be otherwise constructed to provide grooves having the desired stepped relation. These grooves as best shown in Fig. 4 are provided with a rounded bottom and tapered sides. The rounded bottom serves to permit slippage of the cord in the grooves, and the tapered side walls prevent the sides of the grooves from chafing the run of the cord as it passes slightly diagonally from a groove of one roll to the next larger diameter groove of the other roll. The annular grooves of each roll are of successively increasing diameter, this increase is preferably relatively small. For example, each groove may be $\tfrac{1}{32}$ of an inch larger in diameter than the preceding groove. The number of grooves actually used in stretching the cord will depend upon the amount of stretch it is desired to impart to the cord, and the amount or percentage of stretch which may have been imparted to the cord in the preceding spinning and twisting processes. In the construction shown only about two thirds of the grooves of the rolls are actually being used. The cord 17 to be stretched passes from the supply spool 16 to a pair of oppositely disposed grooves near the smaller end of the rolls 41 and 42 and after passing around these grooves 43, the cord run 17' passes diagonally from a lower groove of one diameter to an upper groove of the next larger diameter. In this manner the cord is passed about the free running rolls in a series of convolutions and it will be apparent that as the cord passes from a smaller to a larger groove, the tension upon the cord is increased provided sufficient slippage of the cord about the grooves does not occur to relieve the tension. The tension exerted upon the various convolutions of the cord during the cord stretching operation, has a tendency to pull the rolls 41 and 42 towards each other. It is therefore desirable that these rolls be supported with anti-friction bearings so that they may run freely under the force exerted thereupon by the various cord convolutions. Each of these grooved rolls in the construction shown is mounted upon a short shaft 44 having a threaded shank 45 by means of which it may be rigidly clamped to the bracket 38. Each shaft 44 is preferably provided with a sleeve 46 mounted thereupon by ball or roller bearings, not shown, so as to cause this sleeve to rotate freely upon the shaft 44. Each grooved roll is provided with a central bore of a size that will snugly receive the sleeve 46 so that the roll may be mounted upon this sleeve with a tight driving fit to prevent relative movement between the sleeve and roll during the operation of the tension roll assembly.

After the cord 17 has passed around the rolls 41 and 42 in a sufficient number of convolutions to give the desired stretch to the cord, it is led from one of the larger diameter grooves about the pulleys 29 and 33 and then to the take-up spool 21 or 23. It is found in practice that the cord being supplied to the free running rolls may slip in the first one or two grooves of each roll, likewise it may slip in the last one or two grooves as it leaves these stretching rolls. The least slippage of the cord in the grooves will occur in the central convolutions. This slippage is considered desirable as it tends to compensate for slight irregularities in the construction of the cord. Furthermore, the fact that both rolls are free running and are operated solely by the pull upon the take-up cord appears beneficial to the cord stretching operation, in that it gives an average stretch in adjacent runs or convolutions and permits each roll to rotate at the proper speed with respect to the rate at which the cord is being delivered to the take-up spool. In practice it is found that the free running rolls of the present invention give a cord having from about 2 to 3 per cent. better tensile strength than is secured when the cord is stretched by employing power driven grooved rolls.

The cord 17 is formed of a plurality of yarns twisted to form a strand and a plurality of strands twisted to form a cord as is usual in the construction of tire cord. These twisting operations are preferably carried out in an atmospherically dry condition; that is in an atmospheric condition as distinguished from wet twisting, and the amount of twist imparted to the cord 17 before it is stretched in accordance with the present method is or may be sufficiently high to cause the cord when permanently attenuated or elongated to have the desired twist per inch. The cord 17 as supplied by the spools 16 may therefore be a somewhat overweight and overtwisted cord, and as this cord leaves the free running stretching rolls 41, 42 its weight per unit length will be reduced and it will have a higher tensile strength per unit of weight.

The method and apparatus of the present invention may be employed to stretch cord formed of various materials and having various constructions. The following examples will serve to illustrate one practical use of the invention in treating a cotton tire cord having the construction 14.85/4/2, a gauge of .031 inch, and a length of 1300 yards per pound. The cable twist of this cord was slightly higher than that desired in the finished cord. The cord was stretched in accordance with the present method to impart thereto a permanent elongation of the order of 4½%. It was then found that this cord had a length of 1360 yards per pound and a gauge of .029 inch, that the compactness or density of the cord had been increased and that its property of stretching or elongating while in use had been decreased. The amount of permanent elongation imparted to the cord in accordance with the present invention may however be considerably more or less than the 4½% just mentioned.

It will be apparent from the foregoing that the present invention provides an extremely simple, practical and inexpensive construction for stretching cord, ropes and cables.

Having thus described my invention what I claim and desire to protect by Letters Patent is:

1. In a cord stretching apparatus, cord let-off mechanism, cord take-up mechanism, driving means for the take-up mechanism, and a pair of free running grooved rolls of increasing diameter lengthwise of the rolls in the same direction interposed between the mechanisms and about which the cord passes in a plurality of convolutions for stretching the cord as it advances from the smaller to the larger diameter grooves during its passage from the let-off mechanism to the take-up mechanism.

2. In a cord stretching apparatus, cord let-off mechanism, cord take-up mechanism, driving means for the take-up mechanism, and a pair of free running rolls interposed between the mechanisms and provided with annular grooves arranged in stepped relation and about which the cord passes in a plurality of convolutions so as to stretch the cord as it advances from the smaller to the larger diameter grooves during its passage from the let-off mechanism to the take-up mechanism.

3. In a cord stretching apparatus, cord let-off mechanism, cord take-up mechanism, a pair of free running rolls interposed between said mechanisms and provided with annular grooves arranged in stepped relation and about which the cord passes in a plurality of convolutions so as to stretch the cord as it advances from the smaller to the larger diameter grooves during its passage from the let-off mechanism to the take-up mechanism, and driving means for the take-up mechanism adapted to exert a sufficient take-off pull upon the cord to rotate both rolls and pull the cord from the let-off mechanism.

4. In a cord stretching apparatus for stretching a cord when in an atmospheric dry condition, cord let-off mechanism, cord take-up mechanism, driving means for the take-up mechanism, and a pair of free running rolls provided with annular grooves of successively increasing diameter upon at least one of the rolls interposed between the mechanisms and about which the cord passes in a plurality of runs for stretching the cord as it advances from the smaller to the larger diameter grooves during its travel from the let-off mechanism to the take-up mechanism, whereby the pull exerted upon the cord by the take-up mechanism serves to rotate said stretching rolls and facilitates an adjustment in the tension of the cord in the runs where it is being stretched.

CHARLES J. KILLETTE.